United States Patent
Adam

[15] 3,638,172
[45] Jan. 25, 1972

[54] CABLE CLAMPING DEVICE

[72] Inventor: Georges Clement Adam, 5, rue des Ajoux, 92 Courbevoie, France

[22] Filed: Apr. 23, 1968

[21] Appl. No.: 723,409

[30] Foreign Application Priority Data

Apr. 24, 1967 France .................................. 103,836

[52] U.S. Cl. .............................. 339/249, 24/125, 339/272
[51] Int. Cl. ........................................................ H01r 7/14
[58] Field of Search ............... 339/249, 263, 272; 24/125 N, 24/135

[56] References Cited

UNITED STATES PATENTS

| | | | |
|---|---|---|---|
| 1,631,288 | 6/1927 | Potter | 339/251 |
| 2,434,604 | 1/1948 | West | 339/249 |
| 2,900,688 | 8/1959 | Hicks, Jr. | 24/125 N |
| 3,181,111 | 4/1965 | Moloney | 339/244 |
| 2,907,978 | 10/1959 | Bergan | 339/272 U |

FOREIGN PATENTS OR APPLICATIONS

| | | | |
|---|---|---|---|
| 1,196,742 | 7/1965 | Germany | 339/272 U |
| 376,976 | 6/1964 | Italy | 339/272 U |

*Primary Examiner*—Marvin A. Champion
*Assistant Examiner*—Joseph H. McGlynn
*Attorney*—Waters, Roditi & Schwartz

[57] ABSTRACT

The device assures an electrical and mechanical connection between two bare sections of electric cables by clamping these sections together. The device comprises two distinct elements that can be assembled together to form a ring surrounding the two bare cable sections, and means for clamping together the sections disposed at the interior of this ring. The two elements comprise relatively thick plates curved in the form of U's of the same width, and the ends of the wings of these U's are cut out with complementary tenons and mortises such that these wings can be fitted together two by two to close the ring, only in a direction perpendicular to their middle planes.

7 Claims, 6 Drawing Figures

PATENTED JAN 25 1972 3,638,172
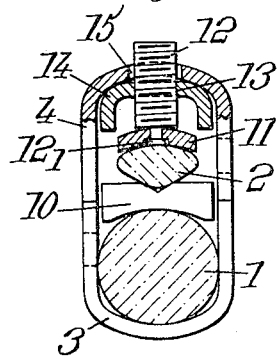
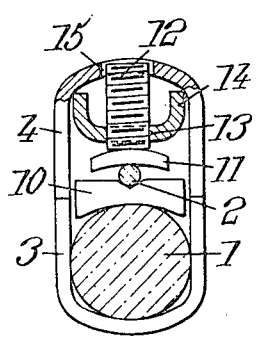
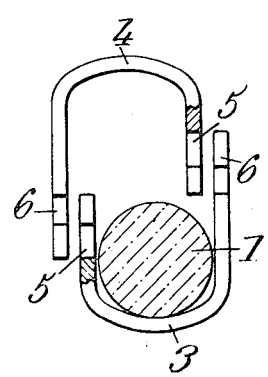
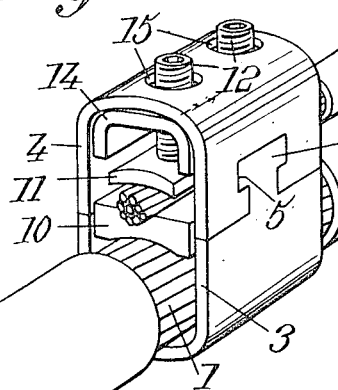
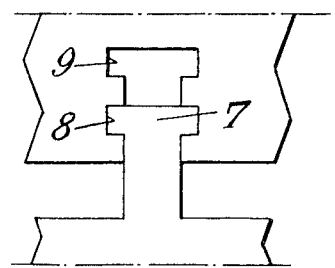
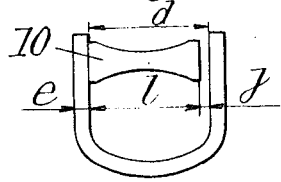

CABLE CLAMPING DEVICE

The present invention relates to cable-clamping devices adapted to assure an electrical and mechanical connection between two bare sections of electric cables by clamping these sections one against the other with the possible interposition of a distribution block; the invention is directed more particularly, but not exclusively, to devices of this type that are adapted to assure the connection of a branching cable on a principal cable without cutting this principal cable, these cables being preferably able to be subjected to an electric voltage of the order of 1,000 to 20,000 volts or more.

The chief object of this invention is to provide devices of this type that fulfill the requirements of practice, and in particular that are simple to assemble and dismantle and are of low cost price.

According to the present invention, a cable-clamping device of the type in question question comprises two distinct elements that can be fitted together to form a ring surrounding the two bare sections to be connected together and means for clamping against each other the sections disposed at the interior of the ring thus formed, and this clamping device is characterized by the fact that these two elements comprise relatively thick plates curved in the form of U's of the same width of which the ends of the wings are cut out by complementary tenons and mortises such that these wings can be fitted together two by two to close the ring only in a direction perpendicular to their middle planes. The locking of these two elements together is preferably assured by a filler whose width is only slightly less than the width of each U, this filler being introduced into the closed ring along a direction parallel to the middle lines of the cable sections. This filler can be formed by a distribution block interposed between the clamping member and one of the cable sections to be connected and/or by a distribution block interposed between the two sections and/or by one of these sections itself.

Other features of the invention, which are preferably used together with the main feature described above, but which could in certain cases by used alone, will become apparent from the following specific description, given merely by way of example, of particular embodiments of the invention. These particular embodiments are described with reference to the accompanying drawings, in which:

FIGS. 1 and 2 represent in transverse section, respectively, two variations of the use of a cable-clamping device according to the invention;

FIG. 3 is a transverse section showing the two parts of the device in the course of assembling;

FIG. 4 is an overall perspective view from above;

FIG. 5 is a partial lateral view of a modification of a cable-clamping device, this modification having multiple mortises;

And FIG. 6 is a schematic diagram bringing out one of the characteristics of the invention.

The cable-clamping devices shown in the drawings are intended for assuring a mechanical and electrical connection between two bare sections of electric cables, at least one of which forms only a part of a continuous, uncut cable extending in both directions from this part.

Before considering in detail the embodiments shown in the drawings, it will be recalled that the cable-clamping devices previously proposed for this purpose comprise essentially two independent pieces adapted to cooperate to form a continuous ring surrounding the sections to be assembled and clamping means for applying against each other the sections introduced into this ring.

But the two pieces of these previous devices, arranged in a manner to cooperate elastically with each other ("click" locking), were fundamentally different, which required different processes of manufacturing for each of them; moreover, these pieces were relatively costly and they comprised sharp edges detrimental from the electrical point of view; these pieces were difficult to assemble together due to the necessity of elastically deforming one of them, and even more difficult to separate from each other after assembling.

In order to remedy these disadvantages, according to the present invention, each of the two pieces in question is formed by a relatively thick plate curved in the form of a U having wings that may or may not be identical, the widths of the two U's corresponding to the two pieces being identical, and complementary mortises and tenons are provided in the ends of these wings adapted to be able to fit together, in a manner to close the ring, only along a direction perpendicular to the wings of the U's; preferably these two pieces are locked together by a wide enough filler introduced into the ring, after closing of this ring, along a direction parallel to the middle lines of the sections to be assembled.

In the embodiments illustrated in the drawings, the cable sections to be assembled have been designated by 1 and 2, the plates that form the ring by 3 and 4 and the mortises and tenons by 5 and 6.

The cable sections to be connected together can have a cross section that is circular, sectoral or otherwise, this cross section preferably offering a flow cross-sectional area for the electric current comprised between 5 square millimeters and 250 square millimeters.

The plates 3 and 4 preferably have a thickness of the order of 1 to 3 millimeters.

One of the plates 3, which comes into direct contact with one bare cable section, is generally made of brass or a nonmagnetic material; the other plate 4 can be made of steel.

The tenons 6 have an enlarged end and the mortises 5 have a narrow opening adapted to hold the tenon.

According to the embodiment represented in the drawings, the form chosen for these mortises and tenons is the form of a T. But another form other than a rectangle could very well be chosen for the enlarged portions of the tenons, for example a circular, elliptical or dovetailed form, the forms of the mortises and tenons being complementary.

The plates 1 and 2 can be arranged according to many variations, in particular according to one of the two following:

according to the first, the two plates are strictly identical, at least with respect to the forms, dimensions and distributions of the mortises and tenons (each comprising for example one mortise on one wing and one tenon on the other wing), which simplifies their manufacture and renders it less onerous, since the same cutting and bending tools can be used for manufacturing the two plates, according to the second variation, the tenons are all carried by one of the plates and the mortises by the other, which can simplify the assembly in certain cases.

Furthermore, several mortises can advantageously be provided at different levels in the wings of the U's in a manner such that it is possible to vary the height of the ring formed by the plates 1 and 2—and hence the thickness of the cable assembly—by choosing one system of mortises rather than another: in the embodiment illustrated in part in FIG. 5, the fitting in place of the tenons 7 in the system of mortises 8 permits the connection of cables of greater cross sections than in the case of the fitting in place of the tenons 7 in the system of mortises 9.

The wings of the two plates thus described can be fitted together two by two to close the ring only along a direction perpendicular to their middle planes. This assembly operation, represented in transverse section in FIG. 3, is carried out, normally, after the bare part of the noninterrupted cable 1 has been introduced transversely into the concavity of one of the plates 3.

It is appropriate to provide a locking of the assembly realized in order to prevent any relative lateral displacement of the two plates, sufficient to allow the tenons and mortises to become separated.

This locking is assured by a filler introduced into the ring formed along a direction parallel to the middle lines of the cable sections.

This filler should cooperate with the four wings of the plates 3 and 4 so as to prevent the separation in question, and for this purpose, the filler should have a sufficient width.

More specifically, the difference $j$ (FIG. 6) between the distance $d$ separating the internal faces of the wings of the plates and the width $l$ of this filler should be less than the thickness $e$ of the plates, at least if the filler remains free in its transverse displacement. In the case in which this filler is centered in one of the plates, the play $j$ is distributed equally on the two sides of the filler and the above condition becomes: $j$, equal to $d-l$, should be less than $2e$.

The filler can be formed by a distribution block 10 interposed between the two sections to be connected; this block 10 is generally made of tin or lead, which are conductive and malleable metals, which can easily be deformed under pressure, and assume the shape of the cables that compress this metal. The flow of the electric current between the cables 1 and 2 is thus assured in good conditions.

In certain cases the locking can be assured by a cable section itself such as 2.

When the zones occupied by the tenons and mortises are disposed substantially at the same level on the two sides of the rings, which occurs in particular when one of the plates 3 comprises all the tenons and the other all the mortises—this case being preferred when the cross sections of the cables to be connected are small—the locking can be assured by a pressure block 11 forming part of the clamping system proper.

In a more general manner, the filler in question can be formed by the assembly of the pieces introduced into the interior of the ring when they have been urged together by the clamping which will now be described.

The clamping in question, intended to assure the mechanical and electrical assembling of the cables, can be effected in various ways, by means of clamping wedges for example, or according to the embodiment represented in the drawings.

According to this embodiment, the clamping of the cables against each other is obtained by pressure screws 12 threaded in tapped holes 13 provided in a support 14 itself applied against the concave part of the plate 4.

The clamping force exerted by the screws 12 is distributed along the cable section 2 by means of the pressure block 11, on which these screws are rivetted at $12_1$ in a manner to be able to turn with respect to this pressure block without being separable from it.

In the preferred case in which several screws 12 are provided, the block 11 is advantageously divided into a number of distinct elements equal to the number of these screws, in a manner to facilitate their independent screwing.

The support 14 can be given the form of a U so that is lends itself to the following double use: in the first case, it is its concavity which is oriented towards the cables, for a cable 2 of large cross section, as shown in FIG. 1, and in the second case, it is its convexity which is oriented towards the cables as shown in FIG. 2, for a cable 2 of small cross section, the curve of this support following the curve of the plate 4 in the first case only.

Openings 15 are provided in the piece 4, against which piece the support 14 bears, to permit the heads of the screws 12 to be reached by means of a clamping key.

The block 11 can be formed by an elastically compressible assembly comprising in particular undulated leaf spring.

As a result, a cable-clamping device is obtained having numerous advantages with respect to known cable-clamping devices, in particular that it is easy to manufacture, to assemble and to dismantle, and that it presents hardly any sharp edges, and that, in its preferred embodiment, it lends itself to the clamping of cables of varied diameters.

To assemble the cable 2 on the noninterrupted cable 1, by means of this cable clamping device, procedure is as follows.

The bare cable section 1 is housing in the concavity of the plate 3. Then, the plates 3 and 4 are assembled, so as to form a closed ring surrounding the cable, by lateral displacement of the plate 4 in a direction normal to the wings of the plates bent in the form of a U. The cable section 2, the block 10 and the means for clamping the sections against each other are then introduced successively into the ring formed, by a longitudinal sliding, along a direction parallel to the middle line of the cable section 1. Then the screws 12 are screwed to clamp the sections against each other. The assembly can then be electrically insulated by embedding it in an insulator.

For dismantling, it is sufficient to repeat the assembly operations in the opposite direction.

The invention is not intended to be limited to the particular embodiments specifically described, since many modifications are possible without departing from the spirit or the scope of this invention.

I claim:

1. A cable clamping device adapted to assure an electrical and mechanical connection between two bare sections of electric cables, by clamping said sections together, comprising two distinct elements that can be assembled together to form a ring surrounding said two bare sections, and clamping means for clamping together said sections disposed within the ring thus formed, wherein said two elements comprise relatively thick plates curved around respective longitudinal axes in the form of U's of the same width, the ends of the wings of said U's being cut out into complementary tenons and mortises such that said wings can be fitted together two by two to close the ring, only by lateral displacement until said axes lie in a common middle plane, said device being adapted to hold said cable sections, even when of varied diameters, one above the other, in said common middle plane of the assembled U's, said clamping means comprising a screw lying in said common middle plane perpendicular to the direction of said cable sections so that said clamping means can urge one cable section towards the other cable section during clamping, said screw being of diameter considerably less than the interior width of each U and being accessible or passing through a hole formed in the bottom of one of the U's which hole is also of diameter considerably less than the interior width of the U's and a locking member, other than said screw, disposed inside said ring at the level of the tenons and mortises, capable of locking said U's against transverse separation, said locking member having a width that is only slightly less than the interior width of each U.

2. A cable-clamping device according to claim 1, wherein said tenons have the general form of a T.

3. A cable clamping device according to claim 1, wherein said clamping means comprises a support disposed within the ring and having a threaded hole which cooperates with said screw, said support bearing, during clamping, against the U plate which is provided with the hole, so as to provide a reaction for the clamping force, and enabling said screw to be sunk within the ring.

4. A cable-clamping device according to claim 1, wherein said locking member is a separate filler adapted to be introduced into the closed ring along a direction parallel to said common middle plane.

5. A cable-clamping device according to claim 4, wherein said locking member is situated between the two cable sections and constitutes a block for distributing the clamping pressure.

6. A cable-clamping device according to claim 4, wherein said locking member comprises a cable section itself.

7. A cable clamping device adapted to assure an electrical and mechanical connection between two bare sections of electric cables, by clamping said sections together, comprising two distinct elements that can be assembled together to form a ring surrounding said two bare sections and clamping means for clamping together said sections disposed within the ring thus formed, wherein said two elements comprise relatively thick plates curved around respective longitudinal axes in the form of U's of the same width, the ends of the wings of said U's being cut out into complementary tenons and mortises such that said wings can be fitted together two by two to close the ring, only by lateral displacement until said axes lie in a common middle plane, said device being adapted to hold said cable sections, even when of varied diameters, one above the other, in said common middle plane of the assembled U's, said clamping means comprising a screw lying in said common middle plane perpendicular to the direction of said cable sections so that said clamping means can urge one cable section towards the other cable section during clamping, said screw being of diameter considerably less than the interior width of each U and being accessible or passing through a hole formed in the bottom of one of the U's which hole is also of diameter considerably less than the interior width of the U's, and a locking member other than said screw, disposed inside the said ring at the level of the tenons and mortises, capable of locking said U's against transverse separation, said locking member having a width that is only slightly less than the interior width of each U, wherein said clamping means comprise a support disposed within the ring and having a threaded hole which cooperates with said screw, said support bearing, during clamping, against the U plate which is provided with the hole, so as to provide a reaction for the clamping force, and wherein said support is in a form of a U adapted to be mounted at will inside said closed ring so that its concavity follows the concavity of one of the plates or on the contrary is opposed to the concavity of said one plate.

* * * * *